United States Patent
Nichele et al.

(10) Patent No.: US 10,116,508 B2
(45) Date of Patent: Oct. 30, 2018

(54) SERVER PROFILE TEMPLATES

(75) Inventors: Caren Moraes Nichele, Porto Alegre (BR); Luis Otavio Da Silva Martins, Porto Alegre (BR); Michelle C. Huang, Houston, TX (US); Julio Cesar Fernandes Correa, Porto Alegre (BR)

(73) Assignee: Hewlett Packard Enterprise Development, LP, Houston, TX (US)

( * ) Notice: Subject to any disclaimer, the term of this patent is extended or adjusted under 35 U.S.C. 154(b) by 265 days.

(21) Appl. No.: 14/395,931

(22) PCT Filed: May 30, 2012

(86) PCT No.: PCT/US2012/039983
§ 371 (c)(1),
(2), (4) Date: Oct. 21, 2014

(87) PCT Pub. No.: WO2013/180703
PCT Pub. Date: Dec. 5, 2013

(65) Prior Publication Data
US 2015/0207682 A1  Jul. 23, 2015

(51) Int. Cl.
*H04L 12/24* (2006.01)
*G06F 9/445* (2018.01)
(Continued)

(52) U.S. Cl.
CPC ...... *H04L 41/0843* (2013.01); *G06F 9/44505* (2013.01); *G06F 15/177* (2013.01);
(Continued)

(58) Field of Classification Search
CPC .. G06F 17/248; G06F 9/455; G06F 17/30575; H04L 41/082; H04L 41/0843;
(Continued)

(56) References Cited

U.S. PATENT DOCUMENTS 6,195,095 B1 * 2/2001 Beer ............... G06F 3/0481
715/839
6,542,516 B1   4/2003 Ravi Kumar et al.
(Continued)

FOREIGN PATENT DOCUMENTS

CN   101529832    9/2009
JP   H11-143701   5/1999
WO   WO-2011/117957  9/2011

OTHER PUBLICATIONS

EPO, Extended European Search Report, dated Dec. 9, 2015, App. No. 12877932.9, 7 pps.
(Continued)

*Primary Examiner* — Andrew C Georgandellis
(74) *Attorney, Agent, or Firm* — Brooks, Cameron & Huebsch, PLLC

(57) ABSTRACT

Methods, systems, and computer-readable media with executable instructions stored thereon are provided for applying server profile templates. A method includes providing a user interface (UI) to define a template. The template includes a template identifier, a common configuration, and a list of server profiles which share the common configuration. The method further includes using the UI to create a number of server profiles. The template is applied to server profiles such that changes to the common configuration are replicated across all associated server profiles, including associated server profiles with different physical connections.

14 Claims, 7 Drawing Sheets

(51) Int. Cl.
*G06F 15/177* (2006.01)
*H04L 29/08* (2006.01)
(52) U.S. Cl.
CPC .......... *H04L 41/0813* (2013.01); *H04L 41/22* (2013.01); *H04L 67/303* (2013.01)
(58) Field of Classification Search
CPC ............. H04L 41/0856; H04L 41/0809; H04L 41/0813; H04L 12/2424; H04L 41/0806; H04L 41/0886
USPC ......................... 709/219, 220, 223, 203, 221
See application file for complete search history.

(56) References Cited

U.S. PATENT DOCUMENTS

| | | | | |
|---|---|---|---|---|
| 7,206,827 | B2 * | 4/2007 | Viswanath | G06F 9/505 709/213 |
| 7,694,298 | B2 | 4/2010 | Goud et al. | |
| 7,840,398 | B2 | 11/2010 | Zimmer et al. | |
| 8,108,495 | B1 | 1/2012 | Zuk | |
| 8,122,110 | B1 * | 2/2012 | Wilbur | H04L 41/0843 709/220 |
| 8,826,138 | B1 * | 9/2014 | Denardo | G06F 15/177 307/112 |
| 8,838,750 | B2 * | 9/2014 | Zenz | G06F 9/44505 709/219 |
| 8,984,101 | B1 * | 3/2015 | Viswanath | H04L 67/2842 709/220 |
| 2002/0103994 | A1 * | 8/2002 | Morrison | G06F 9/44505 713/1 |
| 2003/0225867 | A1 | 12/2003 | Wedlake | |
| 2007/0157010 | A1 | 7/2007 | Zenz et al. | |
| 2007/0157172 | A1 * | 7/2007 | Zenz | G06F 9/44505 717/121 |
| 2007/0162892 | A1 * | 7/2007 | Zenz | G06F 9/44505 717/121 |
| 2008/0104215 | A1 | 5/2008 | Excoffier et al. | |
| 2008/0256538 | A1 | 10/2008 | Carter et al. | |
| 2010/0131618 | A1 * | 5/2010 | Brewis | H04L 41/0806 709/220 |
| 2010/0165877 | A1 * | 7/2010 | Shukla | H04L 41/0843 370/254 |
| 2011/0040875 | A1 * | 2/2011 | Scholz | G06Q 10/10 709/225 |
| 2011/0044344 | A1 * | 2/2011 | Hudson | H04L 12/433 370/395.53 |
| 2011/0173302 | A1 * | 7/2011 | Rider | G06F 9/44505 709/220 |
| 2011/0196958 | A1 * | 8/2011 | Bharadwaj | H04L 67/1097 709/224 |
| 2011/0209145 | A1 | 8/2011 | Chen et al. | |
| 2011/0276963 | A1 | 11/2011 | Wu et al. | |
| 2011/0320574 | A1 * | 12/2011 | Felts | G06F 9/44505 709/220 |
| 2012/0072685 | A1 * | 3/2012 | Otani | G06F 11/1451 711/162 |
| 2012/0124211 | A1 * | 5/2012 | Kampas | G06F 9/50 709/226 |

OTHER PUBLICATIONS

Delp, Aaron., "Figuring Out "the Cloud" One Post at a Time," Jan. 25, 2010, Retrieved from http://www.aarondelp.com/2010/01/cisco-ucs-vs-ibm-and-hp-where-are.html, 12 pages.
International Searchng Authority, The International Search Report and the Written Opinion, dated Dec. 28, 2012, 9 Pages.
Unknown., "Unified Network Management for Data, Storage, and Converged Networks," 2011, Retrieved from http://www.brocade.com/downloads/documents/data_sheets/product_data_sheets/Network_Advisor_DS.pdf, 4 pages.

* cited by examiner

```
Server Profile name: VCServerProfile_A
Virtual Serial Number:
Ethernet Connections (network name(s), port speed, PXE, MAC)
  - Network [1]: NET1, AUTO, Use BIOS, 00-21-5A-9B-00-00
  - Network [2]: Unassigned, AUTO, Disabled, 00-21-5A-9B-00-02
iSCSI connections (network name, port speed, MAC)
  - <empty>
FC Connections (fabric name, I/O bay, port speed, WWN)
  - Fabric[1]: FC1, Bay3, 50:01:43:80:02:A3:00:00
FCoE Connections (fabric name, I/O bay, port speed, MAC, WWN)
  - Fabric[1]: FC1, Bay1, AUTO, 00-21-5A-9B-00-04,
    50:01:43:80:02:A3:00:02
  - Fabric[2]: Unassigned, Bay 2, AUTO, 00-21-5A-9B-00-05,
    50:01:43:80:02:A3:00:3
- MAC type: Virtual
- WWN type: Virtual
- SN type: Virtual
iSCSI Boot (iscsi boot config, initiator network config,
authentication)
  - Boot (1): <Empty>
- FC Boot Parameters (Boot type, target port name, LUN)
  - Boot(1): PRIMARY, 50:01:43:80:01:3B:D8:59, 10
- FCoE Boot Parameters (Boot type, target port name, LUN)
  - Boot(1): SECONDARY, 50:01:43:80:01:3B:D8:58, 21
- Target Bay assignment
  - Bay: VCDomain_A1
```

Fig. 4B

```
Server Profile name: VCServerProfile_B
Virtual Serial Number:
Ethernet Connections (network name(s), port speed, PXE, MAC)
  - Network [1]: NET1, AUTO, Use BIOS, 00-21-5A-9B-00-06
  - Network [2]: NET2, AUTO, Disabled, 00-21-5A-9B-00-08
iSCSI connections (network name, port speed, MAC)
  - <empty>
FC Connections (fabric name, I/O bay, port speed, WWN)
  - Fabric[1]: FC1, Bay3, 50:01:43:80:02:A3:00:05
FCoE Connections (fabric name, I/O bay, port speed, MAC, WWN)
  - Fabric[1]: FC1, Bay1, AUTO, 00-21-5A-9B-00-0A,
    50:01:43:80:02:A3:00:07
  - Fabric[2]: FC2, Bay2, AUTO, 00-21-5A-9B-00-0B,
    50:01:43:80:02:A3:00:08
- MAC type: Virtual
- WWN type: Virtual
- SN type: Virtual
iSCSI Boot (iscsi boot config, initiator network config,
authentication)
  - Boot (1): <Empty>
- FC Boot Parameters (Boot type, target port name, LUN)
  - Boot(1): PRIMARY, 50:01:43:80:01:3B:D8:59, 11
- FCoE Boot Parameters (Boot type, target port name, LUN)
  - Boot(1): SECONDARY, 50:01:43:80:01:3B:D8:58, 22
- Target Bay assignment
  - Bay: VCDomain_B1
```

Fig. 4C

SERVER PROFILE TEMPLATES

BACKGROUND

Many organizations, e.g., IT organizations, are managing vast amounts of resources and data. Computing systems can include multiple computing machines, e.g., servers, which may be communicatively coupled over a network. In order to manage server racks or Performance Optimized Datacenters (PODs) in factory or solutions environments, customer sites, and internal labs, server profile settings, e.g., connections and configuration parameters, are established and may from time to time be updated.

In various server domains server profiles can be established. A server profile can include various parameter settings such as; network connections (e.g., Ethernet and iSCSI (internet Small Computer System interface)), fabric connections (e.g., FC (Fiber Channel) and FCoE (Fiber Channel over Ethernet)), as well as types of MAC (Media Access Controller)/WWN (Worldwide Name) addresses and serial number (e.g., factory-default or virtual). Other specific server profile configurations, such as the MAC and WWN addresses in use by each connection, the virtual serial number, Universal Unique ID (UUID), boot settings, server profile name, and bay assignment, e.g., in a server rack, may be managed individually for each server profile.

BRIEF DESCRIPTION OF THE DRAWINGS

FIG. 4B illustrates an example of the pseudo instantiation of FIG. 4A applied to an instance of a server profile in Virtual Domain A in the example of FIG. 2 according to an embodiment of the present disclosure.

FIG. 4C illustrates an example of the pseudo instantiation of FIG. 4A applied to an instance of a sewer profile in Virtual Domain B in the example of FIG. 2 according to an embodiment of the present disclosure.

DETAILED DESCRIPTION

Examples of the present disclosure include methods, systems, and computer-readable media with executable instructions stored thereon for applying server profile templates. Server profiles can be created for various server domains in a datacenter and/or performance optimized datacenter (POD). However, each server profile is managed after its creation. That is, if an IT administrator wants to configure a new connection into the datacenter, e.g., a new Ethernet connection and make available usage of this new resource to the physical servers, for which an identity is defined by the server profile, the IT administrator has to edit each server profile to which the new connection applies. This is a manual task which is error prone and can take hours depending on the number of server profiles which apply the changes. Existing server templates that are applied to and replicated to servers are only applied to similar servers that contain the same network and storage configurations. If there are servers with different physical connection configurations the templates can not be applied. Current templates are not able to identify which part of common configurations can be applied to each server profile independently. That is, the whole template configuration is applied and replaced to all servers associated with the template or none at all.

In contrast, embodiments of the present disclosure can apply and replicate server profile templates regardless of physical connection configurations. This affords the ability to visualize and manage server profiles from a single user interface (UI). One method disclosure herein includes providing a user interface (UI) to define a server profile template. The template includes a template identifier, a common configuration, and a list of associated server profiles which share the common configuration. The method further includes using the UI to create a number of server profiles based on the server profile template or from scratch. The template is applied to server profiles such that changes to the common configuration are replicated across all associated server profiles, including associated server profiles with different physical connections.

Figure 1:
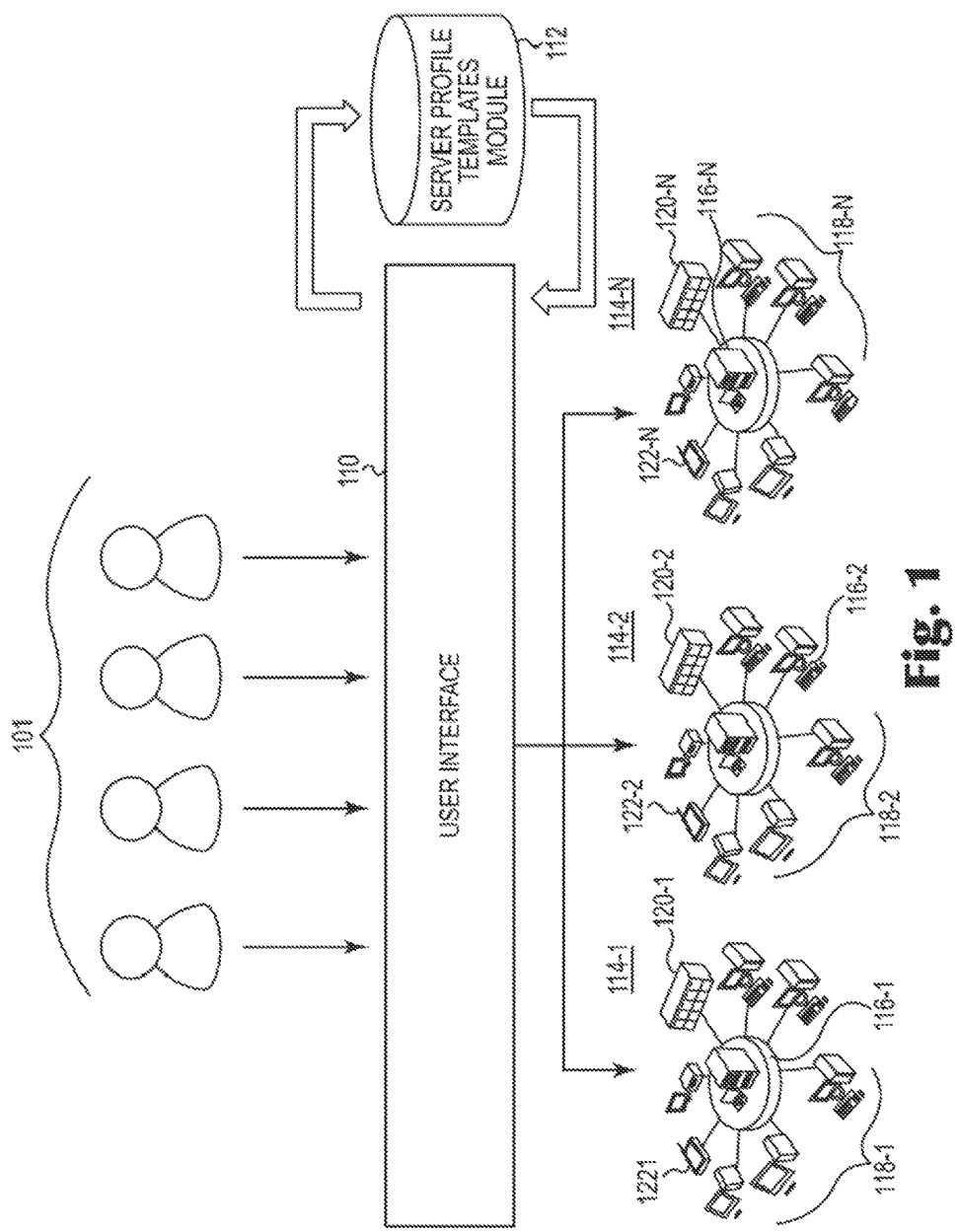
FIG. 1 is an example of a system environment for server profile template application according to the present disclosure.

FIG. 1 is an example of a system environment, for server profile template application according to the present disclosure. As shown in FIG. 1 multiple users 101 with different functions within an organization, e.g., IT administrators, may seek access to IT resources to configure network connections and parameter settings, through a user interface (UI) 110, for various local and/or wide area networks (LANs/WANs) 114-1, 114-2, . . . , 114-N. The networks can include wired and wireless connections and can include intranet and internet connections. Each of the networks 114-1, 114-2, . . . , 114-N can include a number of network devices attached thereto. For example network 114-1 is illustrated including a management server 116-1, and number of computing devices 118-1 (e.g., desktops, workstations and/or laptops mobile devices, etc.), and a number of file servers and/or data storage 120-1. Network 114-2 is also illustrated having a management server 116-2, and number of computing devices 118-2 and a number of file servers and/or data storage 120-2. Network 114-N is also illustrated having a management server 116-N, and number of computing devices 118-N and a number of file servers and/or data storage 120-N. Printer/Scanner/Fax devices 122-1, . . . , 122-N, e.g., all in ones, may also be connected to a given network 114-1, 114-2, . . . , 114-N, respectively.

It is noted that throughout this disclosure the designator "N" is used to indicate a variable number. The consistent use of the designator "N" is to ease reference, but does not intend that the same variable number is intended between its various uses, further, the figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 501 in FIG. 5.

As shown in FIG. 1, the user interface (UI) 110 can be connected to one or more databases 112 containing, e.g., storing, computer readable and executable instructions (CRI), e.g., program instructions, for defining, creating and/or managing server profile templates according to embodiments of the present disclosure. The database 112 may also contain server profiles, such as in a blade server environment, to which the templates may be applied according to embodiments. As mentioned above, server profiles may be created to establish and manage connectivity for various server domains. A server profile can include various parameter settings such as; network connections (e.g., Ethernet and iSCSI), fabric connections (e.g., FC and FCoE), as well as types of MAC/WWN addresses and serial number (e.g., factory-default or virtual). Prior to the embodiments disclosed herein, the complexity of defining and maintaining server profiles and server connectivity in large scale blade server systems involved a great amount of administrative work.

The industry suggests several solutions of how to define and manage server profiles end server connectivity. One example includes the HP BladeSystem Virtual Connect (VC) product portfolio. This product line provides a flexible way to connect servers and virtual machines to any LAN or SAN (storage area network). Embodiments of the present disclosure expand upon this capability by allowing customers to manage multiple VC server profiles for different enclosures at the same time. Reference is made in the present disclosure to the HP BladeSystem VC product portfolio by way of illustration, but not by way of limitation.

Managing multiple VC server profiles at the same time using server profile templates is advantageous when creating new virtual connection server profiles for a large number of blade servers sharing the same resources (e.g., same networks, VLANs and fabrics) or when performing maintenance tasks, such as; visualizing a common configuration shared by a large number of virtual connection server profiles, renaming an existing network connection in use by a large number of virtual connection server profiles or adding a new fabric which is to be used by several blade servers.

Previous approaches to a maintenance task such as, for example, changing server profile connections to a new network available at VC interconnect modules would involve VC customers editing each VC server profile, via a VC Manager embedded application or using a Virtual Connect Enterprise Manager (VCEM), to select the new network name to assign to the specific network connection and then saving the changes. As noted above, this manual task may be error prone and may take hours depending on the number of VC server profiles to which the changes are being applied.

VC Manager and VCEM are both HP products. VC Manager is an embedded application used to handle one virtual server domain. VCEM is a software application capable of handling several hundred virtual server domains. A virtual server domain as used herein is a logical domain versus an express physical domain or boundary. Both VC Manager and VCEM applications provide a Wizard for helping a customer to create multiple VC server profiles at the same time. However, each VC server profile is then individually managed after its creation. For example, if an IT administrator wants to configure a new Ethernet connection into a datacenter and make usage of the new connection resource in the physical servers whose identity is defined by a VC server profile, the IT administrator would have to edit each VC server profile and add a new Ethernet connection pointing to the new Ethernet network resource, or replace an existing network connection to point to the new Ethernet network. As mentioned above, this task may be time consuming.

Other approaches have considered templates that could be applied to servers and replicate template updates to servers. However, these previous approaches are strictly applied to similar servers that contain the same network and storage connections. In these approaches, if there are servers with different physical connection configurations the templates can not be applied.

That is, unlike the present embodiments instructions were not provided which could execute to identity which part of a common configuration can be applied to each server profile with different physical connections. In previous approaches, either the whole template configuration is applied and replaced to all sewers with matching network and storage connections, or the template is not applied, e.g., there is not the ability to account for different physical connections.

Figure 2:
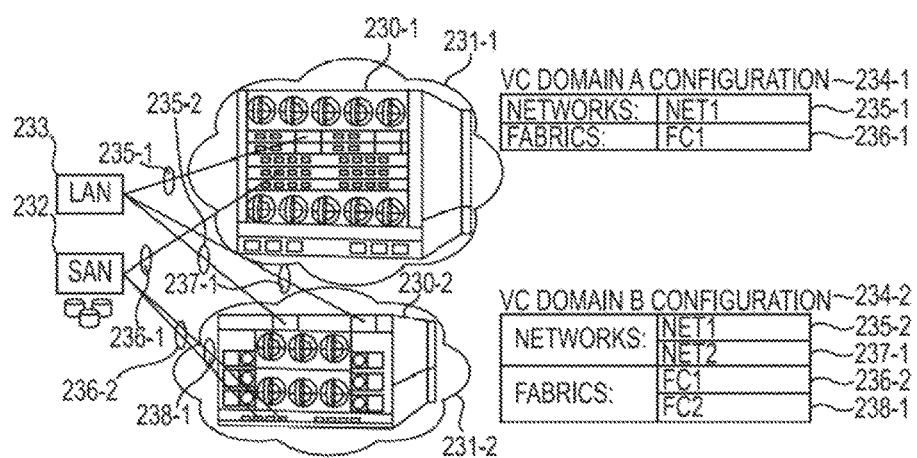
FIG. 2 illustrates an example infrastructure in a data center, having at least two virtual connection domains, in which embodiments of the present disclosure can be implemented.

FIG. 2 illustrates an example infrastructure in a data center, having at least two virtual connection domains. In which embodiments of the present disclosure can be implemented. In the example embodiment of FIG. 2 a downscaled version is illustrated for ease of understanding. However, the embodiments disclosed in connection with the same may be implemented with a larger scale server environment, e.g., involving hundreds of sewer profiles and many virtual domains and enclosures.

In the example embodiment of FIG. 2, two c-Class "physical" enclosures 230-1 and 230-2, e.g., HP c7000 c-Class enclosures, are shown. As the reader will appreciate, an enclosure is "physical" versus "virtual" and may include many bays and servers. A given enclosure contains the physical elements (e.g., VC modules (computer executed code)), servers, etc. as well as provides the connectivity and management for the physical elements (e.g., power supply, fans, etc.). In the example embodiment of FIG. 2, two virtual connection domains 231-1 and 231-2 are illustrated (e.g., virtual connection domain A and virtual connection domain B). As used herein, the virtual connection domain is the software layer which provides connectivity to a storage area network (SAM) 232 and a local area network (LAM) 233 and virtual identity to servers within a given enclosure, e.g., 230-1 and 230-2. In some embodiments a virtual connection domain 231-1 and 231-2 manages a single enclosure, e.g., 230-1 and/or 230-2. However, embodiments are not so limited. That is, in some embodiments a VC module may manage several stacked enclosures. For ease of illustration, a virtual connection domain 231-1 and 231-2 (e.g., virtual connection domain A and virtual connection domain B) is illustrated providing connectivity to a storage area network (SAN) 232 and a local area network (LAN) 233 and virtual identity to servers within a given enclosure.

Multiple VC domains can exist and can be managed at the VCEM application level. However, in at least one embodiment as shown in FIG. 2, the enclosure is the boundary of each VC domain 231-1 and 231-2 (e.g., virtual connection domain A and virtual connection domain B). Different VC domains can exist in the same "Group". A "Group" as used herein is a collection of VC domains that share a same logical (e.g., networks, fabrics, etc.) and a same software/hardware (e.g., VC Ethernet, PC modules-module and I/O location) configuration. That is, certain VC domains can overlap several enclosures as a "Multi-Enclosure Domain (MED). As mentioned above, instructions may be executed to allow VC to define a domain with several stacked enclosures. The MED configuration is mostly used by VC customers who do not use VCEM to manage VC domains. In the example of FIG. 2, VC domain A 231-1 and VC domain B 231-2 have different configurations, e.g., networks and fabrics, and thus are not part of the same Group.

In the example of FIG. 2, a virtual connection module, e.g., an HP VC FlexFabric module, may be provided in association with virtual connection domain A 231-1 (software layer). As shown in the example embodiment of FIG. 2, virtual connection domain A 231-1 has a configuration 234-1 that includes one (1) Network (Net 1) end one (1) PC Fabric (FC1). That is, virtual connection domain A 231-1 has a configuration 234-1 that includes a networks connection of Network 1 (Net 1) 235-1 and a fabrics connection of Fabrics 1 (FC1) 236-1. As shown in FIG. 2, virtual connection domain B 231-2 has a configuration 234-2 that includes two (2) Networks (Net 1 and Net 2) and two (2) FC fabrics (FC1 and FC2). That is, virtual connection domain B 231-2 has a configuration that also includes a networks connection to Network 1 (Net 1) 235-2 and additionally to Network 2 (Net 2) 237-1 and a fabrics connection of Fabrics 1 (FC1) 230-2 and Fabrics 2 (FC2) 238-1. More or fewer networks and fabrics connections are covered by the embodiments disclosed herein. The example of FIG. 2 is used to illustrate a suitable implementation for embodiments of the present disclosure, as discussed farther below.

Figure 3A:
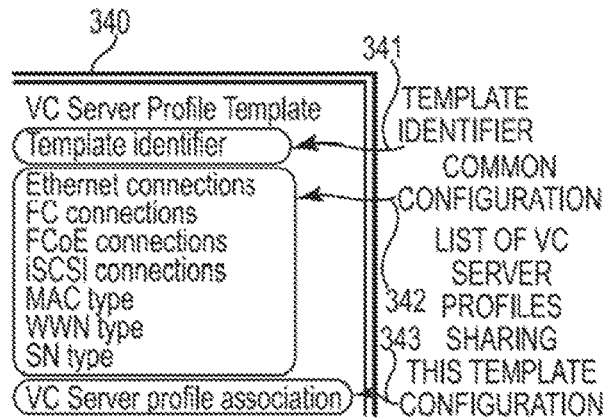
FIG. 3A illustrates an example of a server profile template according to an embodiment of the present disclosure.

FIG. 3A illustrates an example of a server profile template 340 according to an embodiment of the present disclosure. As shown in FIG. 3A a server profile template 340 includes a template identifier 341, a common configuration 342 (e.g., common configuration settings), and a list of associated server profiles which share the common configuration 343 (e.g., template configuration). The server profile template 340 can be stored in database (e.g., database 112 in FIG. 1). As shown in the example embodiment of FIG. 3A, the common configuration 342 can include network connections, e.g., Ethernet connections and Internet Small Computer System Interface (iSCSI) connections, etc. The common configuration 342 can include fabric connections, e.g., Fiber Channel (FC) connections and Fiber Channel over Ethernet (FCoE) connections. The common configuration 342 can also include address and serial number type information, e.g., Media Access Controller (MAC) and/or World Wide Name (WWN) address type information and serial number (SN) type information (e.g., factory, default or virtual). Embodiments, however, are not limited to the examples provided in FIG. 3A. Computer readable instructions, such as program instructions contained in a server profile template application module (e.g., as shown and described in connection with FIGS. 5, 6, and 7), are executed by a processing resource to create and define a server profile template 340 including the information 341, 342, and 343 described above.

Figure 3B:
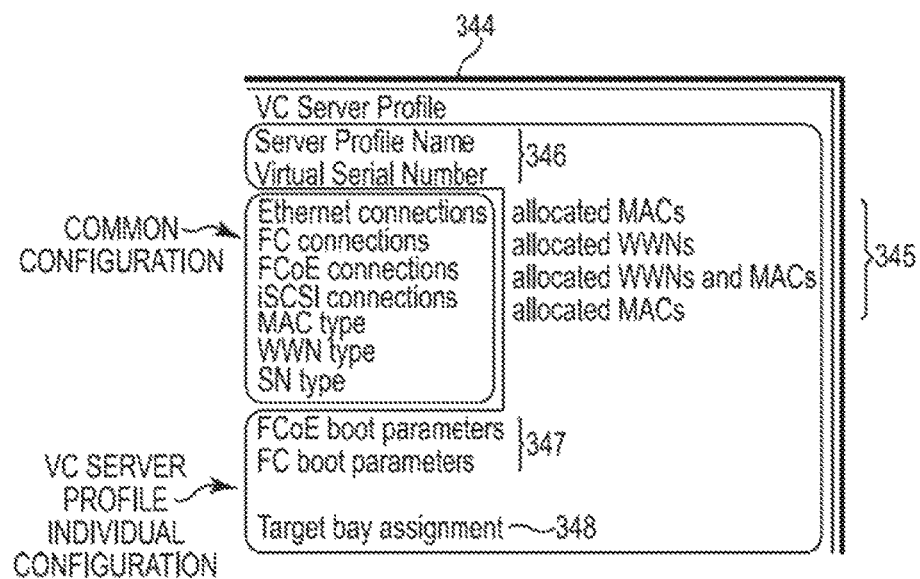
FIG. 3B illustrates an example instance of a server profile applying a server profile template according to an embodiment of the present disclosure.

FIG. 3B illustrates an example instance of a server profile 344, e.g., virtual connection server profile, having a server profile template, e.g., 340 in FIG. 3A, applied thereto according to an embodiment of the present disclosure. As shown in the example embodiment of FIG. 3B, computer executable instructions, such as program instructions contained in a server profile template application module (e.g., as shown and described in connection with FIGS. 5, 6, and 7), can be executed to assign a server profile template (340 in FIG. 3A) to a particular physical server, represented by a server profile 344. The program instructions are executed such that when a server profile template, e.g., 340 in FIG. 3A, is assigned to a particular physical server, represented by a server profile, the program instructions of a virtual connection module (e.g., as shown and described in connection with FIGS. 5, 6 and 7) can execute to retrieve information from the physical server as to the physical server's allocated MACs for Ethernet connections, allocated WWNs for FC connections, allocated WWNs and MACs for FCoE connections, allocated MACs for iSCSI connections 346, etc., all as part of the common configuration.

Further, the program instructions are executed such that when a server profile template, e.g., 340 in FIG. 3A, is assigned to a particular physical server, represented by a server profile, the program instructions of a virtual connection module (e.g., as shown and described in connection with FIGS. 5, 6, and 7) can execute to retrieve information from the physical server as to the server profile name and virtual serial number 346, FCoE boot parameters and FC boot parameters 347, along with a target bay assignment 348, all as part of a VC server profile individual configuration.

Figure 4A:
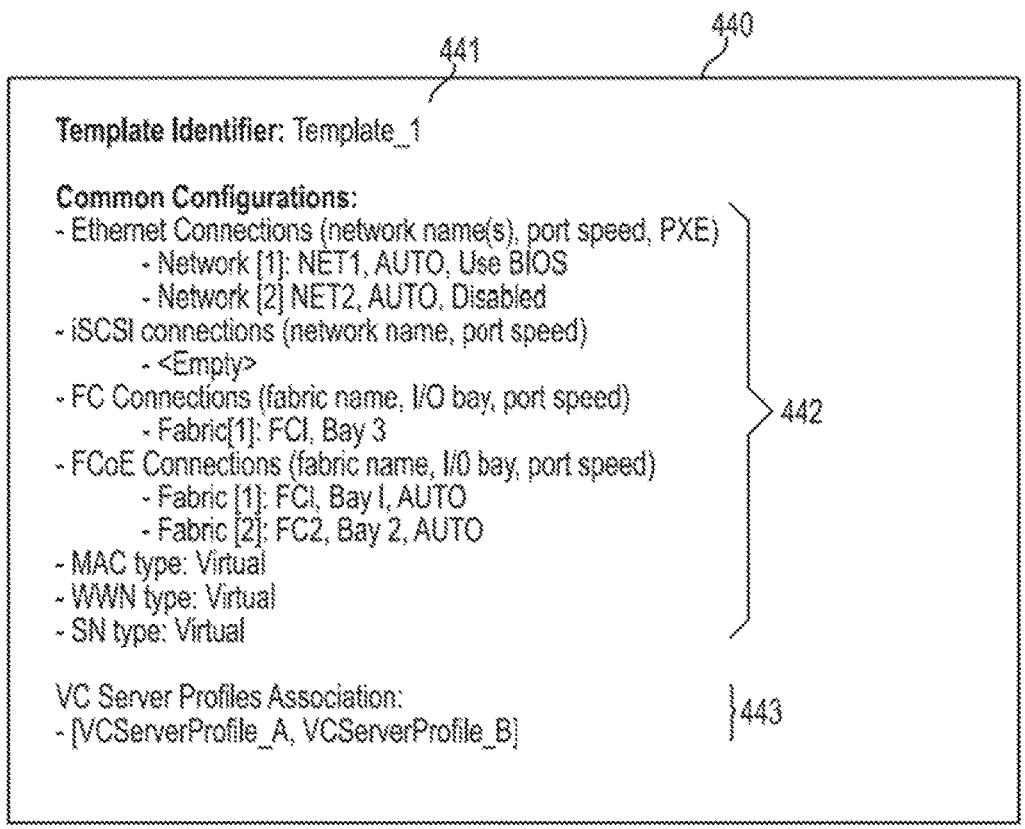
FIG. 4A illustrates an example of a pseudo instantiation of a server profile template according to the present disclosure.

FIG. 4A illustrates an example of a pseudo instantiation of a server profile template 440 according to the present disclosure. The example embodiment of FIG. 4A is referred to herein as a "pseudo" because in actual implementation the server profile template 440 creation and definition may include more attributes man those illustrated and described here. The embodiment of FIG. 4A is described in reference to the example infrastructure embodiment of FIG. 2. As described in connection with FIG. 3A program instructions can be executed to create and define the server profile template 440 to include a template identifier 441, a common configuration 442, and a list of associated server profiles 443, e.g., VC server profiles, using a user interface (e.g., 110 in FIG. 1). The associated server profiles 443 share the common configuration 442.

FIG. 4A illustrates the server profile template 440 has been given the template identifier 441 "Template 1". FIG. 4A further illustrates an example in which the program instructions have been executed to allow a user, e.g., IT administrator, to create through the UI a number of common, configuration settings 442. The common configuration 442 shown includes network connections, e.g., Ethernet connections (having parameters for network name(s), port speed, PXE, etc.).

In FIG. 4A, the program instructions have been executed to create and define two (2) network connections, e.g., Network [1] and Network [2] as part of the common configuration 442. Additional information about these networks, Network [1] and Network [2], is also provided relating to the above parameter, e.g., network name(s), port speed, PXE, etc. The instructions have further been executed to provide for an internet Small Computer System Interface (iSCSI) connection, as part of the common configuration 442, including parameter settings for network name and port speed. As shown in FIG. 4A the template has been created and defined to include FC and FCoE fabric connections, as part of the common configuration 442, including settings for fabric name, I/O bay and port speed. In this example the server profile template 440 has been created and defined to include one (1) FC connection, e.g., Fabric [1], with settings FC1 and Bay3. Two (2) FCoE connections, e.g., Fabric [1] and Fabric [2], have been created and defined with settings FC1, Bay1, Auto and FC2, Bay2, Auto, respectively.

The server profile template 440 shown has further been created and defined to include address and serial number type information. That is, MAC and WWN address types are provided along with a serial number (SN) type. Each is illustrated having a parameter setting, e.g., Virtual.

Finally, as shown in the example embodiment of FIG. 4A, the program instructions have been executed and defined to identify the associated server profiles 443, e.g., list of server profiles, which are to share the common configuration 442. In FIG. 4A the associated server profiles 443 include VCServerProfile_A and VCServerProfile_B.

FIG. 4B illustrates the execution of the program instruction embodiments to apply the server profile template 440 of FIG. 4A to the virtual connection domain A example in FIG. 2, e.g., 231-1. As discussed in connection with FIG. 3B, a user, e.g., IT administrator, can use the UI (110 in FIG. 1) to execute instructions to assign a server a name, type of boot, bay, etc, as part of a server profile. Further as described in connection with FIG. 3B, when the server profile template 440 is assigned to the server profile of VCServerProfile_A in virtual connection domain A, program instructions are executed to retrieve this information from the server and to apply it to the VCServerProfile_A 450. FIG. 4B is referred to as a pseudo instantiation of server profile template 440 in virtual connection domain A because a server profile for virtual connection domain A may define more attributes than the ones illustrated.

As shown in FIG. 4B, application of the server template 440 to VCServerProfile_A 450 in virtual connection domain A causes the program instruction to retrieve the server profile name 451 (VCServerProfile_A) and target bay assignment 458, e.g., Bay: VCDomain_A:1.

Further as shown in FIG. 4B, when the server profile template 440 is assigned to the server profile of VCServerProfile_A, program instructions are executed to retrieve from the physical server the hoot type, bay information as well as the physical server's allocated MACs for Ethernet connections, allocated WWNs for FC connections allocated WWNs and MACs for FCoE connections, allocated MACs for iSCSI connections, etc, relative to the common configuration settings 455 and 457 created and defined in the applied server profile template 440.

Referring to the example infrastructure embodiment of FIG. 2, virtual domain A only has a configuration for one (1) network connection, Net 1, and one fabric, FC1. As such, according to embodiments, the program instructions are executed to ignore or leave "unassigned" 456 an available network connection, Network [2], that is available and provided by the applied server profile template 440. Likewise, the program instructions are executed to leave "unassigned" 459 an available fabric, Fabric [2], that is available and provided by the applied server profile template 440.

FIG. 4C illustrates the execution of the program instruction embodiments to apply the server profile template 440 of FIG. 4A to the virtual connection domain B example in FIG. 2, e.g. 231-2. Here again, a user, e.g., IT administrator, can use the UI (110 in FIG. 1) to execute instructions to assign a server a name, type of boot, bay, etc, as part of a server profile. In FIG. 4C, when the server profile template 440 is assigned to the server profile of VCServerProfile_B in virtual connection domain B, program instructions are executed to retrieve this information from the server and to apply it to the VCServerProfile_B 460. FIG. 4C can also be referred to as a pseudo instantiation of server profile template 440 in virtual connection domain B because a server profile for virtual connection domain B may define more attributes than the ones illustrated.

As shown in FIG. 4C application of the server template 440 to VCServerProfile_B 460 in virtual connection domain B causes the program instruction to retrieve the server profile name 461 (VCServerProfile_B) and target bay assignment 468, e.g., Bay: VCDomain_B:1.

In FIG. 4C, when the server profile template 440 is assigned to the server profile of VCServerProfile_B, program instructions are executed to retrieve from the physical server the boot type, bay information as well as the physical server's allocated MACs for Ethernet connections, allocated WWNs for FC connections, allocated WWNs and MACs for FCoE connections, allocated MACs for iSCSI connections, etc, relative to the common configuration settings 465 and 467 created and defined in the applied server profile template 440.

Again, referring to the example infrastructure embodiment of FIG. 2, virtual domain B has a configuration for two (2) network connections, Net 1 and Net2, and two fabrics, FC1 and FC2. As such, according to embodiments, the program instructions are executed to retrieve from the server and apply the parameter settings for both available network connections. Network [1] and Network [2] 466, as are available and provided by the applied server profile template 440. Likewise, the program instructions are executed to retrieve from the server and apply the parameter settings for both available fabrics, Fabric [1] and Fabric [2] 469, as are available and provided by the applied server profile template 440.

Figure 5:
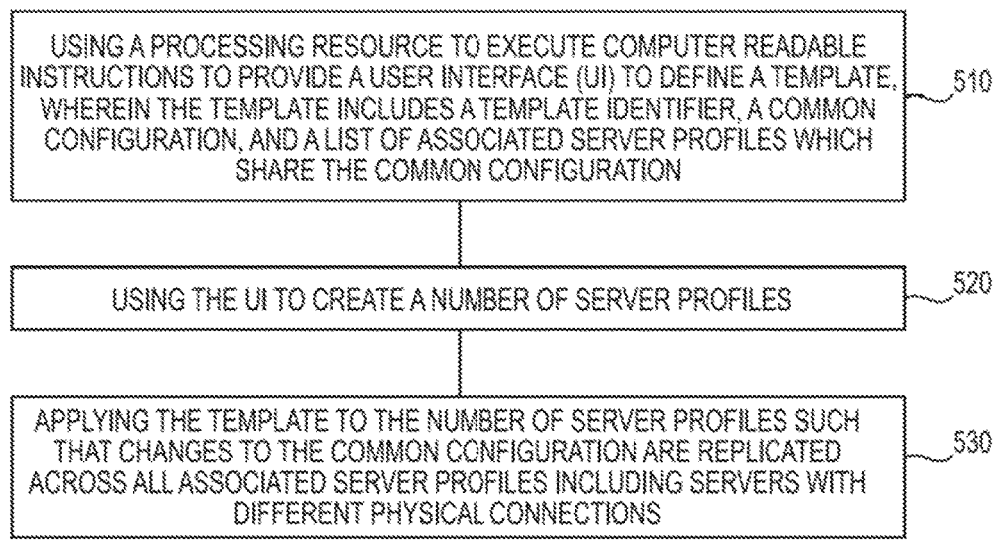
FIG. 5 is a flow chart illustrating an example of a method for applying server profile templates according to the present disclosure.

FIG. 5 is a flow chart illustrating an example of a method for applying server profile templates according to the present disclosure. As shown at block 510 in the example embodiment of FIG. 5, computer readable instructions can be executed by a processing resource to provide a user interface (UI), e.g., 110 in FIG. 1, which can be used to define a server profile template, e.g., 340 in FIG. 3A and/or 440 in FIG. 4A. As described above, program instructions can be executed to create and define a server profile template that includes a template identifier, a common configuration, and a list of associated server profiles which share the common configuration. The program instructions can be executed to define a common configuration (e.g., 342 in FIG. 3A and/or 442 in FIG. 4A) as a list of network connections (e.g., Ethernet iSCSI, etc), fabric connections (e.g., FC, FCoE, etc), MAC (media access controller) and WWN (worldwide name) address types, serial number type, etc At block 520, the method includes executing program instructions to use the UI to create a number of server profiles, e.g., 344 in FIG. 3A, 450 in FIG. 4B and/or 460 in FIG. 4C. In one embodiment, program instructions can be executed to create and define the number of server profiles from the server profile template. In other embodiments, program instructions can be executed to create a new server profile from scratch.

At block 530, the method includes executing program instructions to apply the server profile template to a number of server profiles (e.g., as shown in FIG. 3B and/or FIGS. 4B and 4C) such that changes to the common configuration are replicated across all associated server profiles, including servers with different physical connections. According to embodiments, the program instructions are executed to identify common configurations that can be applied to each server profile and ignore those that cannot (e.g., FIGS. 4B and 4C).

Hence, embodiments provide instructions that can be executed to manage the common configuration and the number of server profiles associated with the server profile template from a single UI. Changes to the common configuration, including; adding, removing, or updating Ethernet, iSCSI, FC, FCoE connections and/or updating MAC, WWN, SN address types, can be implemented and automatically replicated to all associated server profiles.

Program instructions can be executed to copy and/or delete server profile templates. A server profile association to a particular server profile template (e.g., 443 in FIG. 4A)

is automatically removed in the case where a common configuration is changed (e.g., deleting or changing an Ethernet connection) directly at the individual server profile level. Adding extra connections to a given server profile are allowed and do not change the common configuration. As such, the same server profile template can be shared by server profiles from different virtual connection domains and between servers with different physical connectivity.

Figure 6:
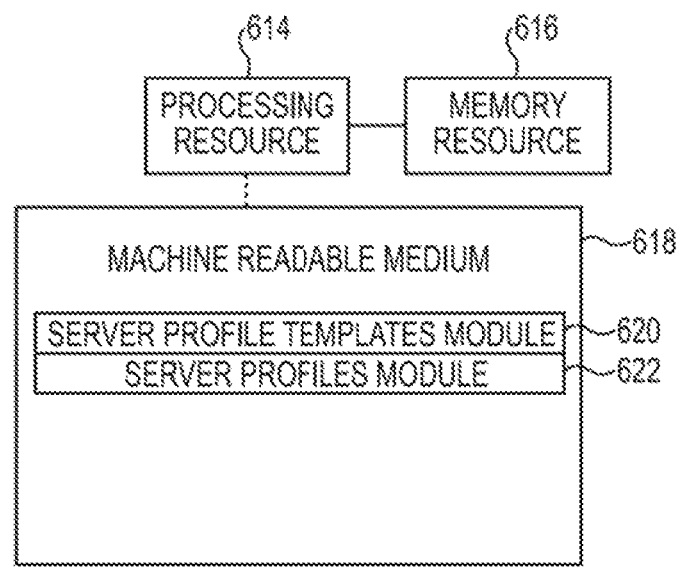
FIG. 6 is a block diagram depicting a memory and a processing resource according to an example of the present disclosure.

FIG. 6 illustrates a system according to an example of the present disclosure. FIG. 6 is a block diagram illustrating a processing resource 614, a memory resource 616, and a non-transitory, machine readable medium 618, including modules having computer executable instructions stored thereon that can be executed to perform particular acts and functions, according to the present disclosure. The processing resource 614 and the memory resource 616 can be local to a network device such as a network security platform, a network controller, management server (e.g., 116 in FIG. 1), or another network device, e.g., such as shown in. The machine readable medium 618 and/or the memory resource 618 store program embodiments (e.g., software, firmware, etc.) executable by the processing resource 614. The machine readable medium can be local to the network device or remote therefrom. For those examples in which the machine readable medium is remote from the network device, the instructions can be loaded into the memory resource 616 of the network device.

As used herein, a processing resource 614 can include one or a plurality of processors such as in a parallel processing system. A memory resource 616 can include memory addressable by the processing resource 614 for execution of machine readable instructions 618, e.g., program instructions. The memory resource 616 can include volatile and/or non-volatile memory such as random access memory (RAM), static random access memory (SRAM), electronically erasable programmable read-only memory (EEPROM), magnetic memory such as a hard disk, floppy disk, and/or tape memory, a sold state drive (SSD), flash memory, phase change memory, etc.

As shown in FIG. 6, the machine readable medium 618 can include a server profile template module 620 including a particular set of instructions that are executed by the processing resource 616 to provide a user interface (UI), e.g., 110 in FIG. 1, to create and define a server template profile, e.g., as shown in FIGS. 3A and 4A, and/or to access existing server profile templates at a database pool of server profile templates, e.g., server profile templates module 112 in FIG. 1.

The server template profile module 620 executes instructions to create and define a server profile template having a template identifier, a common configuration, and a list of associated server profiles which share the common configuration as described in connection with FIGS. 3A and/or 4A. The server template profile module can further execute instructions to access, retrieve and/or modify existing sewer template profiles including the template identifier, the common configuration, and the list of server profiles.

In the example embodiment of FIG. 6, the server profile template module 620 executes instructions to apply a particular server profile template to a number of server profiles associated therewith, e.g., as shown in FIGS. 3B, 4B and 4C, such that changes to a common configuration are replicated across all server profiles associated with the server profile template. As noted above, instructions can be executed to copy and/or delete templates.

As shown in FIG. 6, the machine readable medium 618 can include a server profiles module 622 including a particular set of instructions that are executed by the processing resource 616 to provide a user interface (UI), e.g., 110 in FIG. 1, to create and define a number of server profiles. By way of example, and not by way of limitation, a number of server profiles may be created and defined using a VC Manager and/or VCEM. Thus, the server profile module 622 can execute instructions to change network connections, fabrics, identifiers and/or other parameter settings directly at the individual VC server profile level.

According to embodiments a VC server profile association to a VC server profile template will be automatically removed in the case where the common configuration is changed directly at the individual VC server profile level. However, adding extra connections to the VC server profile level are allowed since such action do not change the common configurations. Thus, the same server profile template can be shared by VC server profiles from different VC domains and between servers with different physical connectivity.

The server profile templates embodiments described herein may contain any type of connections and can be used as a baseline for creating a VC server profile at any VC domain. Additionally, the server profile templates embodiments described herein do not have to take into consideration the physical differences between VC domains, e.g., VC interconnect modules, or the available features in each VC firmware version.

Hence, a server profile template can be created and defined using the server profile template module 620 and a customer can create several server profiles (each assignable to different VC domains: enclosures/bays, etc.) using the server profile module 622 and/or based on a particular server template using the server profile template module 620. As shown in FIGS. 4B and 4C, any unsupported connection types defined in a server profile template associated to a VC server profile are simply ignored when applying the particular VC server profile to a server in a particular VC domain which does not support such connection types. During the VC server profile assignment time, if detected that a network or fabric in use by a connection defined in the common configuration does not exist in the VC domain, that network or fabric connection type is disassociated from the particular VC server profile connection while keeping the associated to the server profile template.

According to embodiments a definition of a common configuration can be efficiently assembled in a server profile template and easily replicated to a large number of server profiles. New server profiles can be created from scratch or through re-using an existing server profile template. Changes to the common configurations (e.g., change of a Network name in an Ethernet connection in use by hundreds of server profiles) can be performed from the server profile template level and automatically replicated to all server profiles which are associated with the server profile template. The common configurations in use by the server profiles can be visualized and managed from a single user interface.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

The term "a number of" is meant to be understood as including at least one but not limited to one.

What is claimed:

1. A method for applying server profile templates, comprising:
    using a processing resource to execute computer readable instructions to:
        define a server template through a user interface (UI), wherein the server template includes a server template identifier, common configuration settings, and a list of associated server profiles which share the common configuration settings;
        create a number of server profiles through the UI; and
        for each server profile in the list of associated server profiles:
            replicate the common configuration settings from the server template to the server profile in response to detecting changes to the common configuration settings in the server template;
            evaluate a domain configuration associated with the server profile to identify each physical connection for which there is a configuration in the domain configuration;
            configure physical connections of a physical server represented by the server profile with a first portion of the common configuration settings replicated to the server profile, the first portion of the common configuration settings being configuration settings for physical connections which are identified as having a configuration in the domain configuration; and
            ignore a second portion of the common configuration settings replicated to the server profile by not configuring the physical connections of the physical server represented by the server profile with the second portion of the common configuration settings replicated to the server profile, the second portion of the common configuration settings being configuration settings for physical connections which are not identified as having a configuration in the domain configuration.

2. The method of claim 1, wherein the instructions are executed to configure, responsive to detecting that a configuration for a new physical connection configurable by the second portion of the common configuration settings is added to the domain configuration associated with the server profile, the new physical connection at the physical server represented by the server profile with the second portion of the common configuration settings.

3. The method of claim 1, wherein the instructions are executed to define the common configuration settings as a defined value for Ethernet connections, a defined value for iSCSI (internet small computer system interface) connections, a defined value for fiber channel (FC) connections, a defined value for fiber channel over Ethernet (FCoE) connections, a defined value for a MAC (media access controller) address type, a defined value for a WWN (worldwide name) address type, and a defined value for a serial number type.

4. The method of claim 1, wherein the instructions can be executed to define the number of server profiles from the template or as a new server profile.

5. The method of claim 1, wherein the instructions are executed to manage the common configuration and the number of server profiles associated with the template from a single UI.

6. The method of claim 1, wherein the instructions are executed to implement changes to the common configuration including modifying a configuration selected from a group comprising an Ethernet connection configuration, an iSCSI connection configuration, fiber channel (FC) connection configuration, a fiber channel over Ethernet (FCoE) connection configuration, a MAC address type, a WWN address type, and an SN address type.

7. The method of claim 1, wherein the instructions are executed to allow the template to be copied and/or deleted.

8. A non-transitory computer-readable medium storing a set of computer executable instructions thereon, which if executed by a computer cause the computer to:
    define a server template through a user interface (UI), wherein the server template includes a server template identifier, a common configuration, and a list of associated server profiles which share the common configuration;
    create a server profile, wherein the instructions can be executed to create the server profile from an existing template; and
    for each server profile in the list of associated server profiles:
        replicate the common configuration settings from the server template to the server profile in response to detecting changes to the common configuration settings in the server template;
        evaluate a domain configuration associated with the server profile to identify each physical connection for which there is a configuration in the domain configuration;
        configure physical connections of a physical server represented by the server profile with a first portion of the common configuration settings replicated to the server profile, the first portion of the common configuration settings being configuration settings for physical connections which are identified as having a configuration in the domain configuration; and
        ignore a second portion of the common configuration settings replicated to the server profile by not configuring the physical connections of the physical server represented by the server profile with the second portion of the common configuration settings replicated to the server profile, the second portion of the common configuration settings being configuration settings for physical connections which are not identified as having a configuration in the domain configuration.

9. The non-transitory computer readable medium of claim 8, wherein the set of instructions, if executed by the computer cause the computer to define the server profile as a new server profile.

10. The non-transitory computer readable medium of claim 8, wherein the set of instructions if executed by the computer cause the computer to replicate a change to the template to all associated server profiles sharing the common configuration.

11. The non-transitory computer readable medium of claim 10, wherein the set of instructions if executed by the computer cause the computer to:

remove a profile server association to the template if the common configuration is changed directly at an individual server profile level.

12. The non-transitory computer readable medium of claim 10, wherein the set of instructions if executed by the computer cause the computer to:

configure, responsive to detecting that a configuration for a new physical connection configurable by the second portion of the common configuration settings is added to the domain configuration associated with the server profile, the new physical connection at the physical server represented by the server profile with the second portion of the common configuration settings.

13. A system for application of server profile templates, comprising:

a user interface (UI);

a processing resource; and a non-transitory computer readable medium storing computer executable instructions thereon, which if executed by the processing resource cause the system to:

define a server template through the UI, wherein the server template includes a server template identifier, a common configuration, and a list of associated server profiles which share the common configuration;

create a number of server profiles through the UI; and for each server profile in the list of associated server profiles:

replicate the common configuration settings from the server template to the server profile in response to detecting changes to the common configuration settings in the server template;

evaluate a domain configuration associated with the server profile to identify each physical connection for which there is a configuration in the domain configuration;

configure physical connections of a physical server represented by the server profile with a first portion of the common configuration settings replicated to the server profile, the first portion of the common configuration settings being configuration settings for physical connections which are identified as having a configuration in the domain configuration; and ignore a second portion of the common configuration settings replicated to the server profile by not configuring the physical connections of the physical server represented by the server profile with the second portion of the common configuration settings replicated to the server profile, the second portion of the common configuration settings being configuration settings for physical connections which are not identified as having a configuration in the domain configuration.

14. The system of claim 13, wherein the instructions, if executed by the processing resource cause the system to:

create at least one of the number of server profiles using the template.

* * * * *